United States Patent [19]

Rodman

[11] Patent Number: 5,386,682
[45] Date of Patent: Feb. 7, 1995

[54] FRUIT PICKER APPARATUS

[76] Inventor: Victor W. Rodman, P.O. Box 620114, Orangevale, Calif. 95662

[21] Appl. No.: 185,258

[22] Filed: Jan. 24, 1994

[51] Int. Cl.6 .............................................. A01D 46/24
[52] U.S. Cl. ........................................ 56/338; 56/332
[58] Field of Search ............... 56/239, 332, 338, 339, 56/340

[56] References Cited

U.S. PATENT DOCUMENTS

| 2,748,555 | 6/1956 | Le Cocq | 56/338 |
| 3,507,107 | 4/1970 | Harms et al. | 56/336 |
| 4,531,352 | 7/1985 | Henningsgaard | 56/336 |
| 4,608,813 | 9/1986 | Gialanza | 56/338 |
| 4,835,955 | 6/1989 | Gaubis | 56/333 |
| 4,976,032 | 12/1990 | Battaglia | 30/298 |
| 5,083,418 | 1/1992 | Reece | 56/239 |

Primary Examiner—David J. Bagnell

[57] ABSTRACT

A support shaft mounts a cutter frame having a curer cooperative with a stationary cutter to receive a tree limb therethrough to effect its severing. Basket structure is arranged for mounting below the cutter frame to receive the severed tree or fruit component.

6 Claims, 4 Drawing Sheets

FRUIT PICKER APPARATUS

BACKGROUND OF THE INVENTION

1. Field of the Invention

The field of invention relates to fruit picking apparatus, and more particularly pertains to a new fruit picker apparatus wherein the same is arranged for the severing and containment of fruit picked from a tree.

2. Description of the Prior Art

Various tree cutting apparatus have been indicated in the prior art such as exemplified in U.S. Pat. Nos. 3,507,107; 4,531,352; and 4,835,955.

The instant invention attempts to overcome deficiencies of the prior art by providing for a fruit picker apparatus arranged for ease of use as well a compact and effective construction and in these respects, the present invention substantially fulfills this need.

SUMMARY OF THE INVENTION

In view of the foregoing disadvantages inherent in the known types of fruit picker apparatus now present in the prior art, the present invention provides a fruit picker apparatus wherein a frame receives a fruit member therethrough for reception within an underlying basket structure. As such, the general purpose of the present invention, which will be described subsequently in greater detail, is to provide a new fruit picker apparatus and method which has many of the advantages of the prior art mentioned heretofore and many novel features that result in a fruit picker apparatus which is not anticipated, rendered obvious, suggested, or even implied by any of the prior art, either alone or in any combination thereof.

To attain this, the present invention provides a support shaft that mounts a cutter frame having a cutter cooperative with a stationary cutter to receive a tree limb therethrough to effect its severing. Basket structure is arranged for mounting below the cutter frame to receive the severed tree or fruit component.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fruit picker apparatus and method which has many of the advantages of the prior art mentioned heretofore and many novel features that result in a fruit picker apparatus which is not anticipated, rendered obvious, suggested, or even implied by any of the prior art, either alone or in any combination thereof.

It is another object of the present invention to provide a new fruit picker apparatus which may be easily and efficiently manufactured and marketed.

It is a further object of the present invention to provide a new fruit picker apparatus which is of a durable and reliable construction.

An even further object of the present invention is to provide a new fruit picker apparatus which is susceptible of a low cost of manufacture with regard to both materials and labor, and which accordingly is then susceptible of low prices of sale to the consuming public, thereby making such fruit picker apparatus economically available to the buying public.

Still yet another object of the present invention is to provide a new fruit picker apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
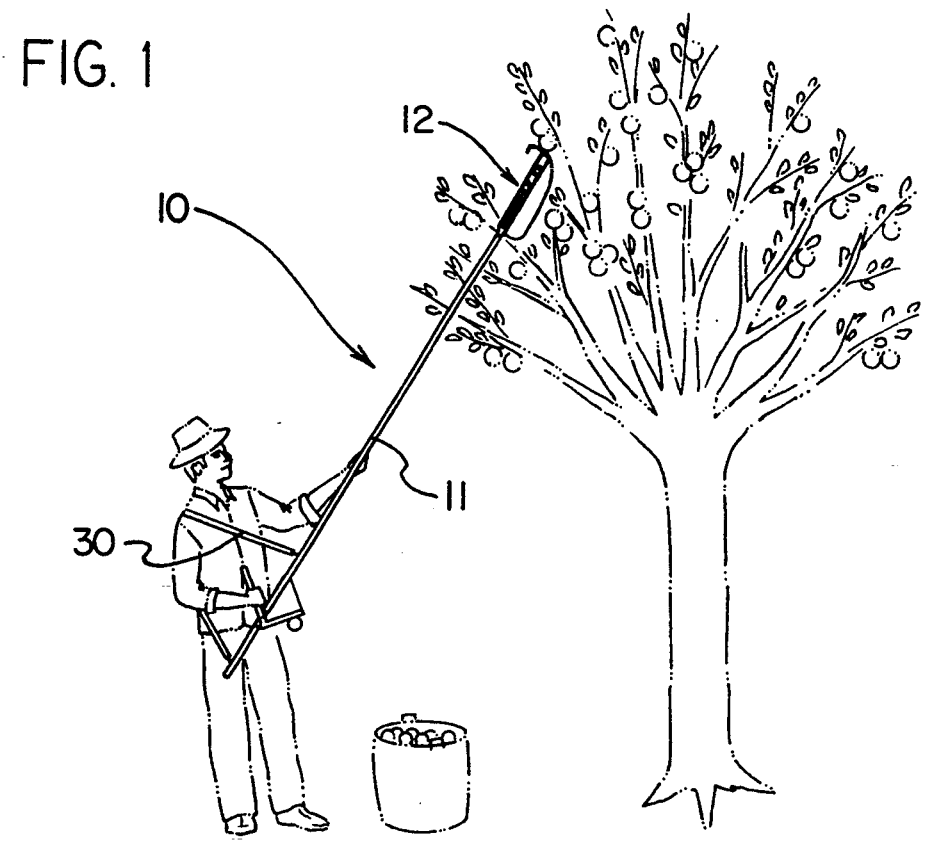
FIG. 1 is an isometric illustration of the invention in use.

With reference now to the drawings, and in particular to FIGS. 1-8 thereof, a new fruit picker apparatus embodying the principles and concepts of the present invention and generally designated by the reference numeral 10 will be described.

More specifically, the fruit picker apparatus 10 of the instant invention generally comprises a support shaft 11 having a cutter frame 12 mounted to an outermost distal end of the support shaft. The cutter frame 12 includes spaced parallel tracks 13 mounting a slide plate 19 therebetween. A first lug 14 integrally and orthogonally mounted to the support frame 12 is spaced from and parallel to a second lug 15 integrally mounted in an orthogonal relationship to the slide plate. A first opening 16 is directed through the cutter frame between the first and second lugs 14 and 15, with a slide rod 17 secured and directed through the second lug 15 and slidably mounted through the first lug 14. The slide rod 17 is connected to a pull cable 31, and more specifically the pull cable first end 31a is secured to the slide rod 17 beyond the first opening 16. A return spring 18 is captured between the first lug and the second lug 14 and 15, respectively, about the slide rod 17 to bias the slide plate 19 beyond the first opening, as illustrated in FIG. 2.

Figure 3:
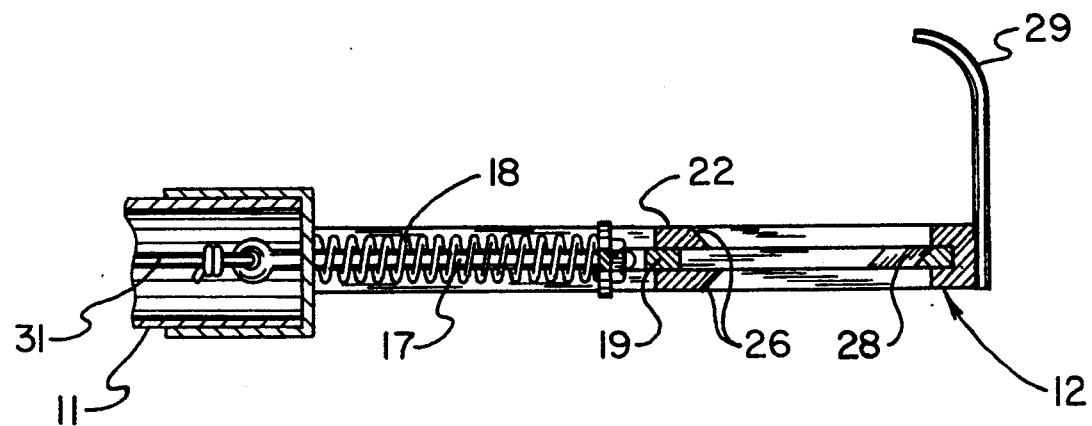
FIG. 3 is a cross sectional view, taken along the lines 3—3 of FIG. 2 in the direction indicated by the arrows.

A spaced second opening 20 is longitudinally aligned with the first opening 16 and is directed through the cutter frame 12, with the second opening having second opening first and second ends 22 and 23, respectively. As best illustrated in FIG. 3, the second opening first end 22 includes a fixed cutter pair 26 orthogonally oriented relative to the longitudinal axis of the slide rod 17. The slide plate 19 is formed with a slide plate cutter 28 of a generally V-shaped configuration in facing relationship relative to the first cutter pair 26. Upon tensioning of the pull cable 31, the slide plate cutter 28 cooperates with the fixed cutter pair 26, such that a workpiece directed through the second opening is severed for deposit into an underlying flexible support basket 35 which will subsequently be described in greater detail.

Figure 2:
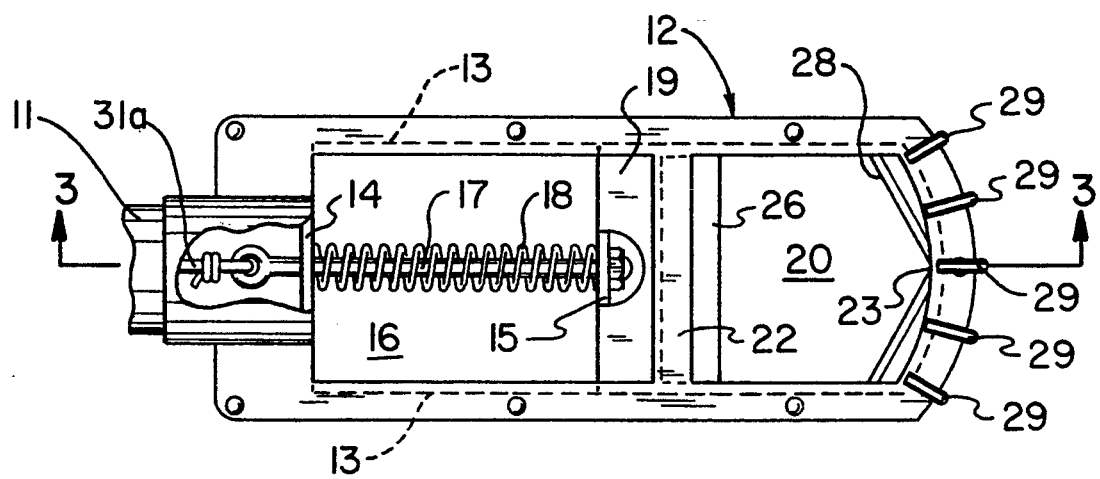
FIG. 2 is an orthographic top view of the cutter frame structure.

A plurality of upwardly extending tongs 29 project from the cutter frame 12 and are positioned near the second end 23 thereof, as best illustrated in FIGS. 2 and 3. The tongs are arranged in a curvilinear relationship to one another such that respective unlabeled tips thereof point towards a center of the second opening 20. Each of the tongs 29 is shaped as an upwardly extending rod which angles inwardly toward the center of the second opening at a distal end of each rod. The tongs 29 allow a user to manipulate fruits and other harvestable items into the second opening 20, whereby severing of the supporting plant material may be accomplished.

Figure 4:
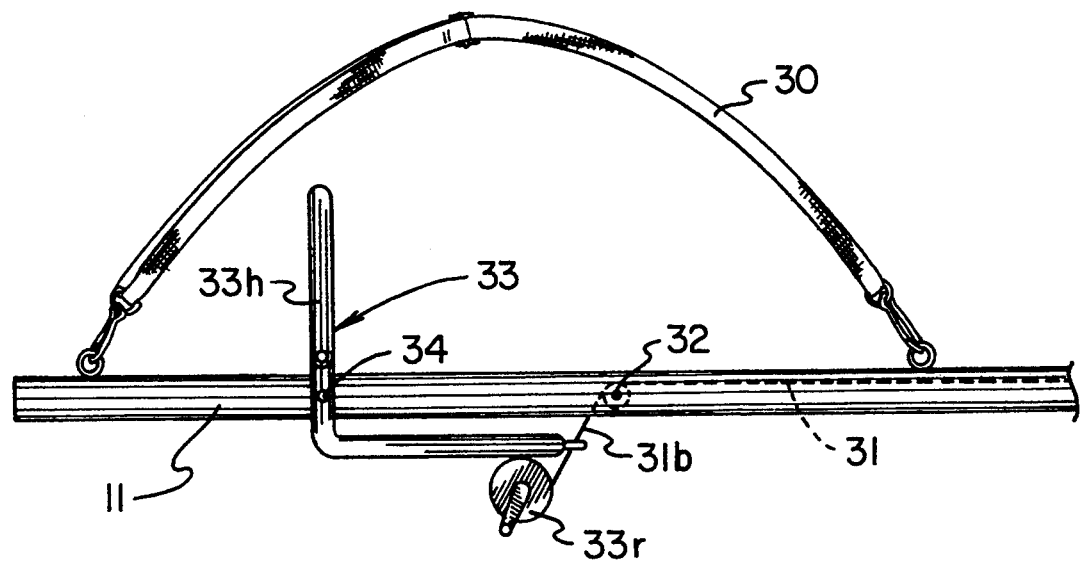
FIG. 4 is an side elevation view of the support shaft and shoulder strap structure.

The slide plate may be biased against the force of the spring 18 by an application of tension to the pull cable 31. Such application may be provided by a pivoting of an actuator lever 33, as illustrated in FIG. 4. The actuator lever 33, that in turn has the pull cable second end 31b secured thereto pivots about an axle 34, that in turn is mounted to the support shaft 11. The pull cable 31 is guided about a guide roller 32, whereupon pivoting of the actuator lever 33 effects tensioning of the pull cable 31 and displacement of the slide plate 19 to extend within the first opening 16.

The actuator lever 33 includes a pivoting handle 33h which may be folded compactly for storage, and a reel assembly 33r about which excess cable 31 may be wound to provide for selective adjustment of the angle of the actuator lever with respect to the handle 11. Additionally, a carrying strap 30 may be provided to facilitate support and transportation of the apparatus 10.

Figure 5:
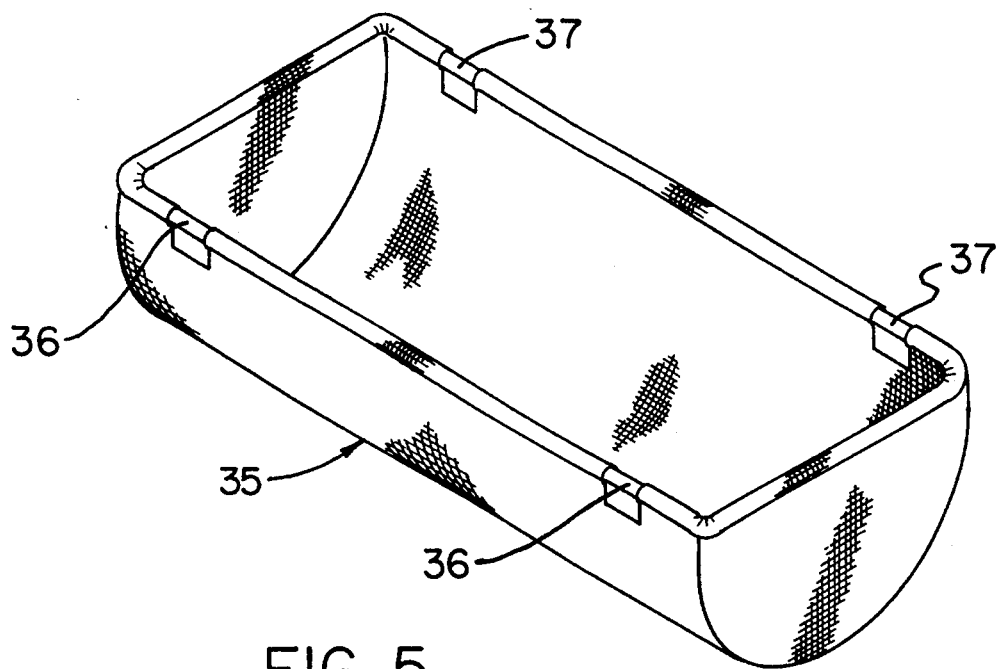
FIG. 5 is an isometric illustration of the basket structure.
Figure 6:
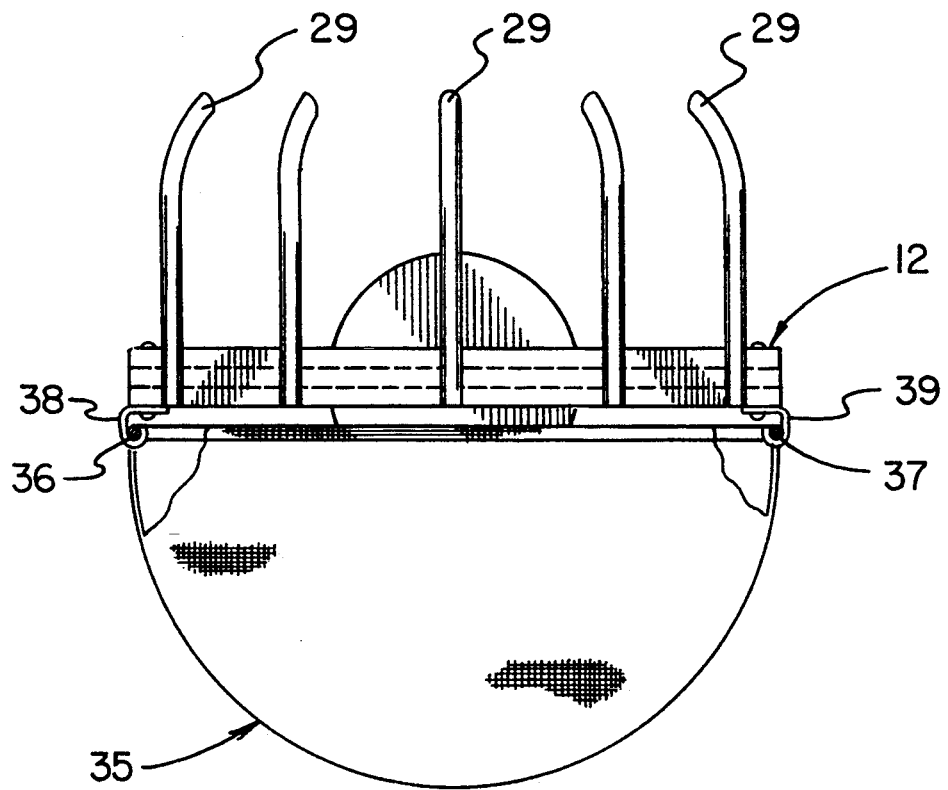
FIG. 6 is an end elevation view of the basket structure mounted to the cutter frame.
Figure 7:
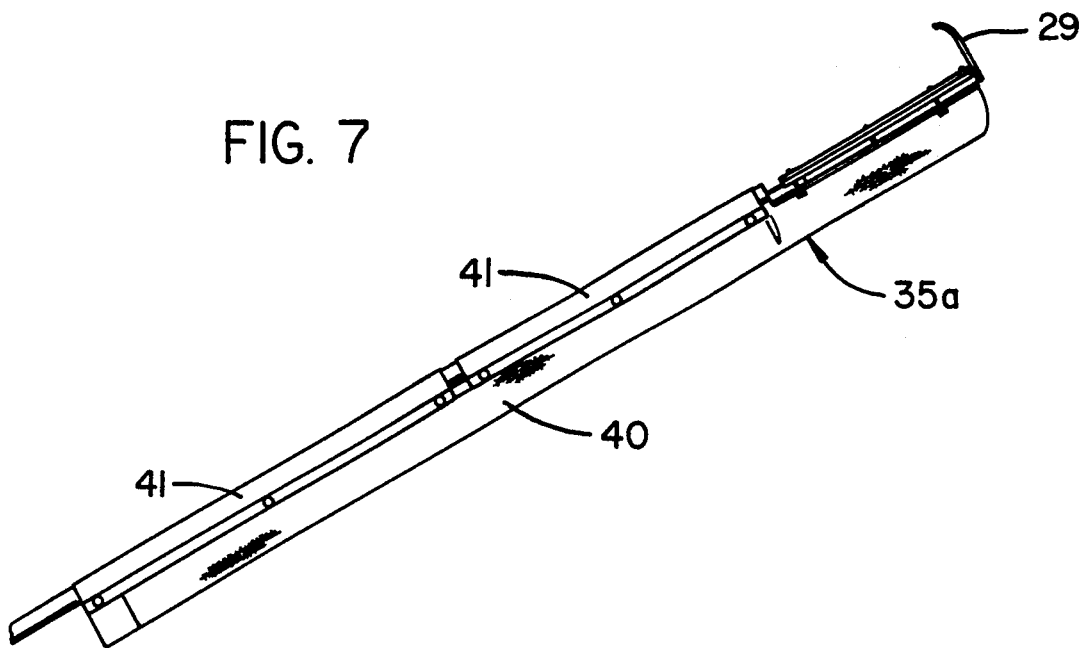
FIG. 7 is an orthographic side view of a modified basket structure.
Figure 8:
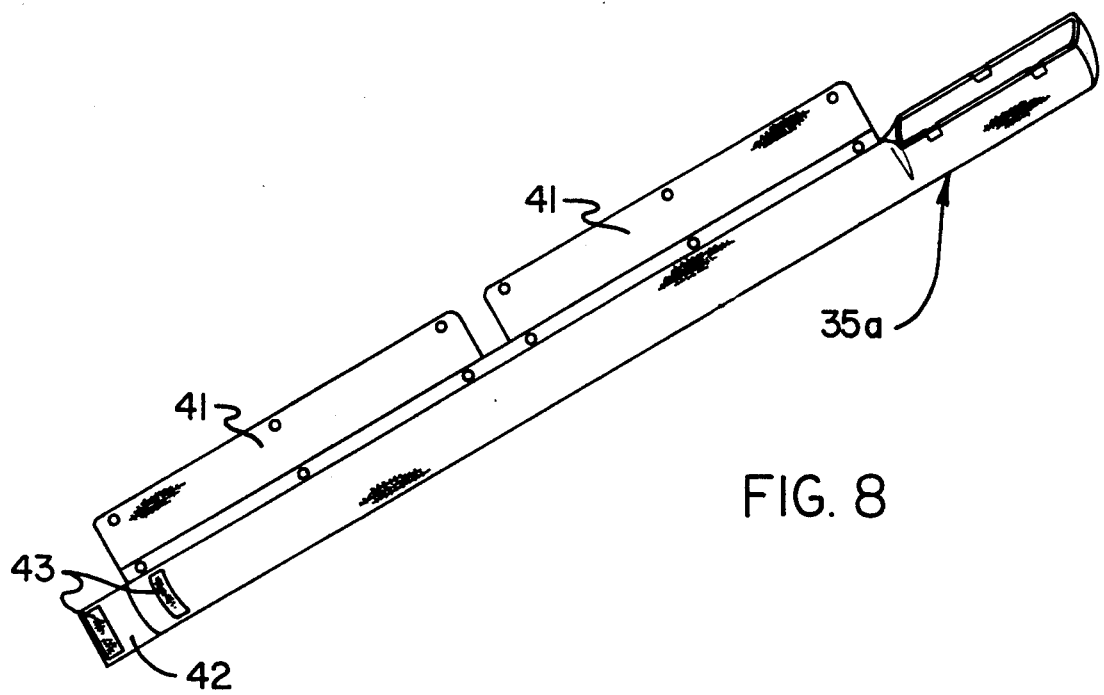
FIG. 8 is an orthographic side view of the modified basket structure.

The support basket 35, such as illustrated in FIG. 5, includes spaced first and second frame rails 36 and 37, wherein the first frame rail 36 is mounted to first rail support clips 38 to a first side of the cutter frame 12, with the second side of the cutter frame having second rail spring clips 39 to engage the second rail 37. A modified basket 35a, as indicated in FIGS. 7 and 8, includes a basket extension tube 40 extending from the basket structure parallel along the support shaft 11, with shaft flaps 41 extending over the support shaft 11 and secured to the extension tube 40 by snap fasteners, VELCRO (TM) fasteners, or the like. The extension tube 40 also includes an end flap 42 having end flap fasteners 43 to permit selective opening and closing of the end flap, such that fruit directed through the tube may be selectively dispensed therefrom by a disengaging the end flap fasteners 43 from one another, whereby the end flap may be opened to receive such fruit through the extension tube 40.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the construction and operation shown and described, and accordingly, all suitable modifications and equivalents may be resorted to, falling within the scope of the invention.

What is claimed as being new and desired to be protected by Letters Patent of the United States is as follows:

1. A fruit picker apparatus comprising:

an elongate support shaft including an outermost end and having a first lug fixedly and orthogonally mounted to the support shaft;

a cutter frame mounted to the outermost end, the cutter frame being longitudinally aligned relative to the support shaft, the cutter frame including spaced parallel tracks, the cutter frame further having a first opening directed therethrough and a second opening directed therethrough, with the first opening and the second opening being longitudinally aligned through the cutter frame, the second opening having first and second ends;

a fixed cutter pair mounted at said first end of said second opening;

a slide plate slidably directed along the spaced parallel tracks, the slide plate having a second lug fixedly and orthogonally mounted to the slide plate within the first opening, the slide plate having a slide plate cutter in facing relationship relative to the fixed cutter pair;

a slide rod mounted to the second lug and slidably directed through the first lug;

a return spring captured between the first lug and the second lug, the return spring being concentrically positioned about the slide rod;

a pull cable having a cable first end secured to the slide rod and a cable second end spaced from the cable first end;

a lever axle directed into the support shaft;

an actuator lever pivotally mounted about the lever axle, with the cable second end secured to the actuator lever, whereupon pivoting of the actuator lever effects tensioning of the pull cable and displacement of the slide plate to direct the slide plate from a first position spacing the first lug and the second lug apart to a second position directing the first lug and the second lug together, whereupon displacement of the slide plate to the second position directs the slide plate cutter into respective cooperation with the fixed cutter pair.

2. The apparatus as set forth in claim 1, wherein the cutter frame includes a first frame side and a second frame side spaced from said first frame side, and further comprising a flexible support basket, the support basket including a first frame rail spaced from a second frame rail; first rail support clips secured to the first frame side of the cutter frame and operable to receive the first frame rail; second rail spring clips secured to the second frame side of the curer frame and operable to receive the second frame rail, said clips cooperating to releasably mount the support basket relative to the cutter frame.

3. The apparatus as set forth in claim 2, wherein the basket further includes an extension tube extending along the support shaft, with at least one shaft flap extending over the support shaft for securement of the tube to the support shaft.

4. The apparatus as set forth in claim 3, wherein the tube includes an end flap, and end flap fasteners mounted to both the end flap and to the extension tube to permit selective securement of the end flap relative to the tube, wherein the tube includes an exit opening, with the end flap extending over said exit opening to selectively close said opening.

5. The apparatus as set forth in claim 4, and further comprising a plurality of upwardly extending tongs projecting from the cutter frame and arranged in a curvilinear relationship to one another, the tongs including tips thereof which point towards a center of the second opening, the tongs each including a distal end and being shaped as an upwardly extending rod which angles inwardly toward the center of the second opening at the distal end thereof, the tongs being operable to allow a user to manipulate harvestable items into the second opening.

6. The apparatus as set forth in claim 5, and further comprising a reel coupled to the actuator lever for reeling and storing excess cable and to alter an angle of the actuator lever relative to the shaft.

* * * * *